Sept. 21, 1965         E. FELIX         3,206,971
FORCE MEASURING APPARATUS
Filed Nov. 30, 1962                 4 Sheets-Sheet 1
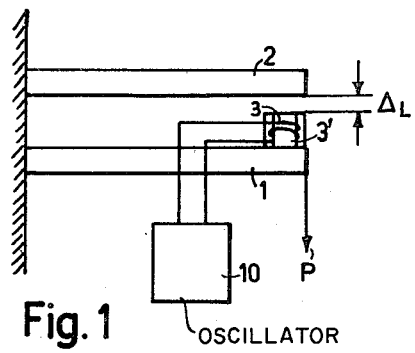
Fig. 1
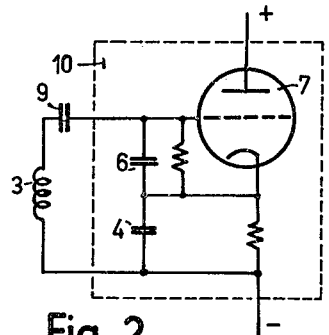
Fig. 2
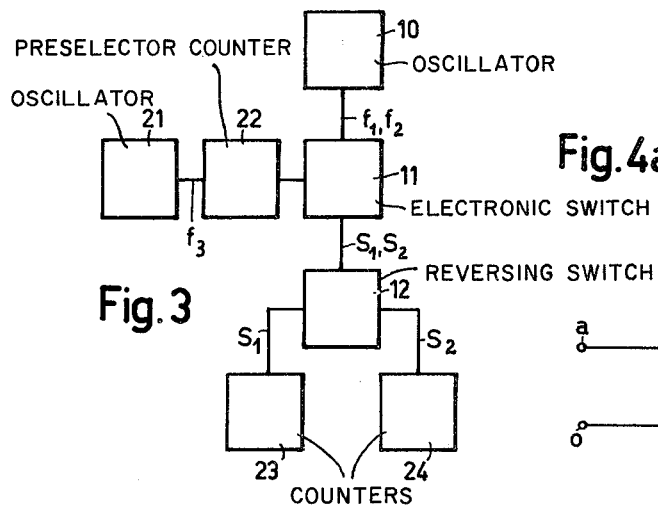
Fig. 3
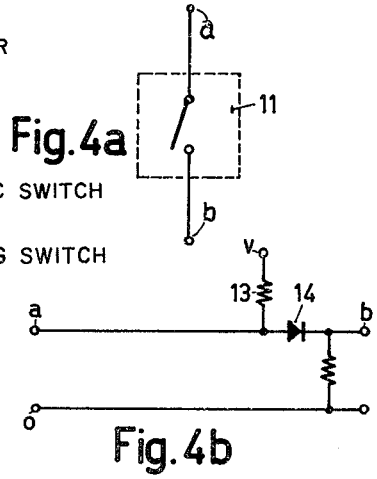
Fig. 4a
Fig. 4b
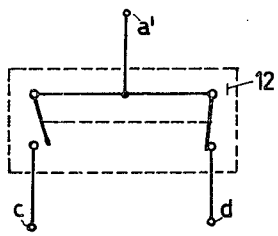
Fig. 5a
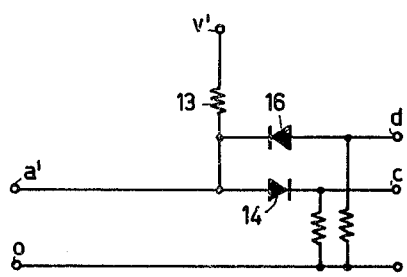
Fig. 5b
Inventor
ERNST FELIX
by  [signature]
ATTORNEY

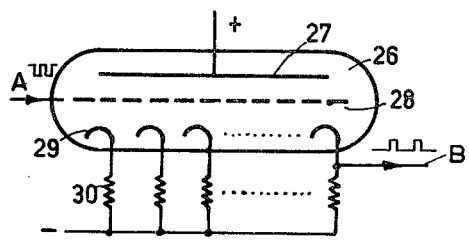
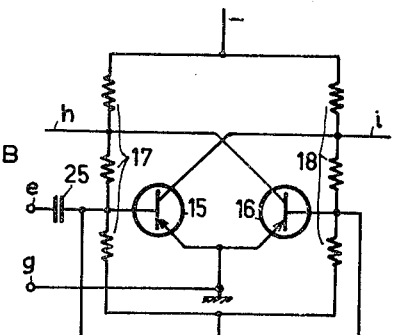
Fig. 6      Fig. 7
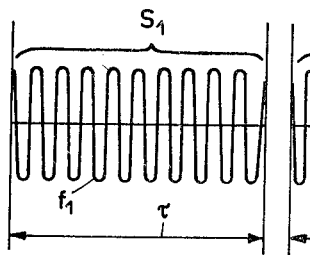
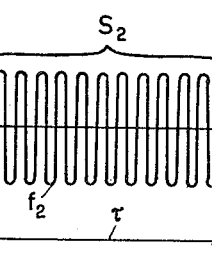
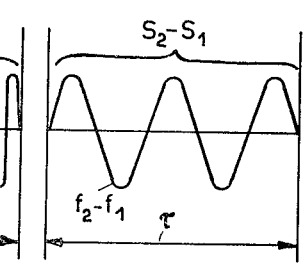
Fig. 8a    Fig. 8b    Fig. 8c
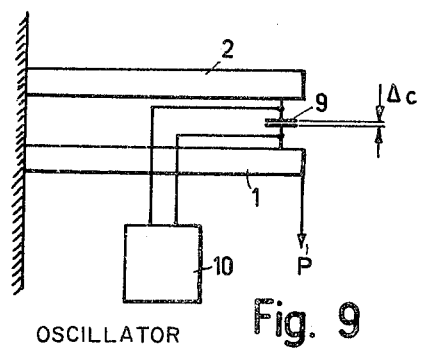
Fig. 9

Sept. 21, 1965   E. FELIX   3,206,971
FORCE MEASURING APPARATUS
Filed Nov. 30, 1962   4 Sheets-Sheet 3

Inventor
ERNST FELIX
by Robert W. Siddler
ATTORNEY

Sept. 21, 1965    E. FELIX    3,206,971
FORCE MEASURING APPARATUS
Filed Nov. 30, 1962    4 Sheets-Sheet 4
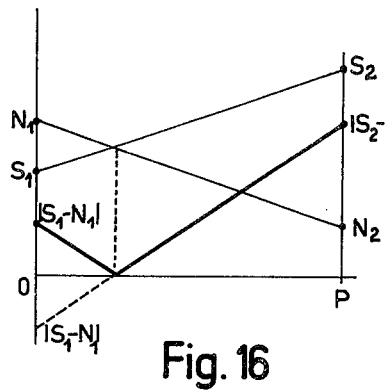
Fig. 16
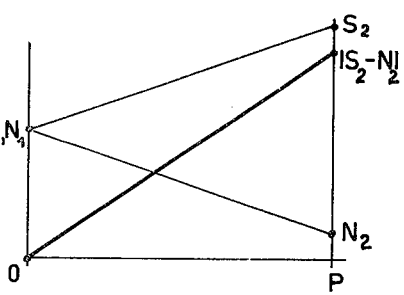
Fig. 17
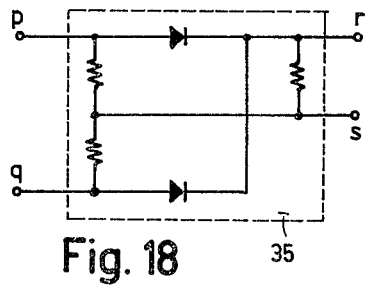
Fig. 18
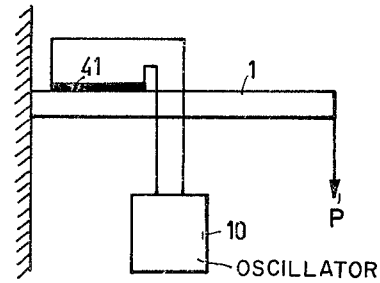
Fig. 19
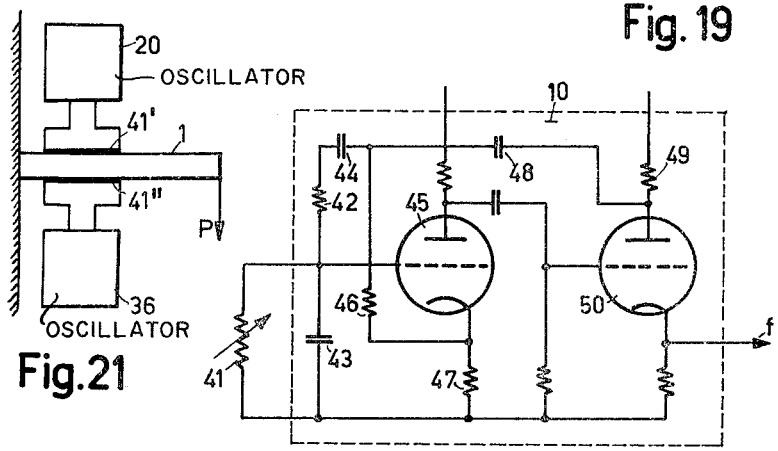
Fig. 21
Fig. 20
Inventor
ERNST FELIX
by *Robert W. Fiddler*
ATTORNEY

United States Patent Office 3,206,971
Patented Sept. 21, 1965

3,206,971
FORCE MEASURING APPARATUS
Ernst Felix, Uster, Switzerland, assignor to Zellweger Limited, Uster, Switzerland, a Swiss corporation
Filed Nov. 30, 1962, Ser. No. 241,192
Claims priority, application Switzerland, Dec. 8, 1961, 14,220/61
7 Claims. (Cl. 73—141)

This invention relates to measuring means, more particularly to apparatus for providing digitally indicated measurement of forces.

A variety of methods and devices are today available for the measurement of forces. The type to be selected is determined primarily by the particular measuring purpose since each application involves special requirements. This, for example, in the measurement of forces in material testing equipment in order to obtain desired accuracy, a wide measuring range and a short deformation distance of the measuring member are necessary. A variety of mechanical, electrical, optical, and other methods and devices have been evolved in an attempt to meet these requirements.

In measuring forces by electro-mechanical systems, a measuring member is arranged to deliver an electrical quantity (voltage or current) which is proportional to, or in some defined relationship to the force to be measured. Thus a direct indication of the force to be measured is possible on a measuring instrument. Problems are encountered in that the measuring range and the accuracy of the force measurements are relatively small. Additionally, the necessary so-called zero constancy is difficult to obtain for a wide range of force measurement. Zero constancy is understood to mean the relative deviation of the electrical indication from the desired indication value at zero force. This arises due to inevitable instability factors in the system. The measuring range and accuracy of such known methods can only be extended with considerable expense, and an increase in the required complicity of manipulation of the measuring apparatus. Accordingly, compromise solutions have been proffered according to which measuring members are provided with only a small measuring range thus requiring the availability of a plurality of different measuring members in order to cover the entire measuring range.

Where the materials tested are subject to variation, and mean values of a sampling population are sought, then statistical techniques are employed for handling the test results. These statistical calculations may be carried out electronically, in which case the above-mentioned electrical quantities may be applied, for example, to the input of an analogue computer. However, if digital computers are used for such calculating operations (which is a great advantage), the measurement result must first be converted into a digital quantity. This conversion has in the past been relatively involved and expensive in order to obtain desired accuracy.

It is with the above problems and desiderata in mind that the here presented novel means have been evolved, means having particular utility in testing materials and providing for digital determination of forces acting on a test specimen in a simple fashion, with the range of forces and accuracy of measurement being relatively large.

It is accordingly among the primary objects of this invention to provide improved force measuring means providing a digitally indicated result.

Another object of the invention is to provide force measuring means having a relatively wide range of measurement and a zero constancy.

These and other objects of the invention which will become hereafter apparent are attained by providing a method and novel apparatus for practicing the method.

According to the method the force acting on a test specimen is applied to a spring member to resiliently deform same. The deformation of the spring member influences a frequency-determining member of an electric oscillator. The number of oscillations of the oscillator frequency during an interval of time when the spring member is in the unstressed condition is counted and the number of oscillations of the modified oscillator frequency during a time interval in which the spring member is in the stressed condition is likewise counted. A comparison of the counted oscillations serves as a measure of the force taking into consideration the intervals of time used.

In apparatus for carrying out the method, a frequency-determining part of an oscillator is coupled to a spring member. The resilient deformation of the spring member caused by the forces to be measured produces frequency changes in the oscillator corresponding in magnitude to the deformation. A counting device is coupled to the oscillator and counts the number of oscillations at the particular oscillator frequency in the unstressed and in the stressed condition of the spring member which appear during predetermined intervals of time, the counting values obtained representing a digital measure of the force to be measured.

The invention will be described in full, clear and concise terms in conjunction with the accompanying drawings, wherein:

FIG. 1 diagrammatically illustrates an arrangement of a spring member with a coil so that the inductance of the coil changes on deformation of the spring member;

FIG. 2 diagrammatically illustrates an oscillator in which a coil with variable inductance produces frequency changes;

FIG. 3 is a block diagram of an arrangement for obtaining a digital indication of an oscillator frequency;

FIGS. 4–7 illustrate the circuit components comprising the arrangement of FIG. 3.

FIGS. 4a and 4b show the principle and a circuit diagram of an electronic on-off switch;

FIGS. 5a and 5b show the principle and a circuit diagram of an electronic reversing switch;

FIG. 6 is a diagrammatic illustration of a counting tube;

FIG. 7 is a diagrammatically illustrated multivibrator stage (pulse reducer);

FIG. 8a is a graphic illustration of a number of oscillations $S_1$ during an interval of time $t$;

FIG. 8b is a graphic illustration of a number of oscillations $S_2$ during an interval of time $t$;

FIG. 8c is a graphic illustration of the difference between the oscillations $S_2-S_1$ during an interval of time $t$;

Figure 10:
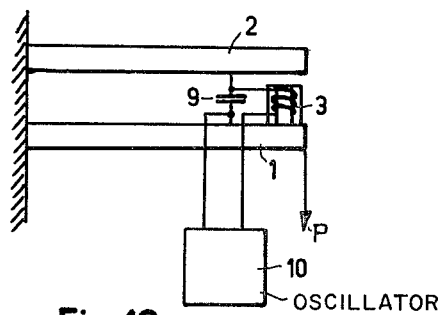
Figure 11:
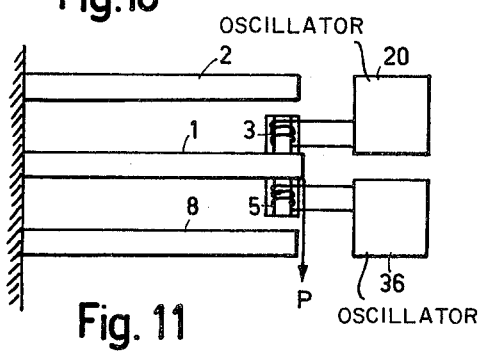
Figure 12:
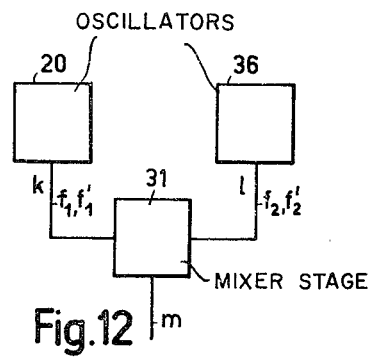
Figure 13:
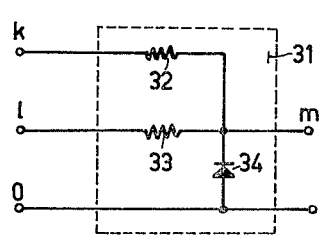
Figure 14:
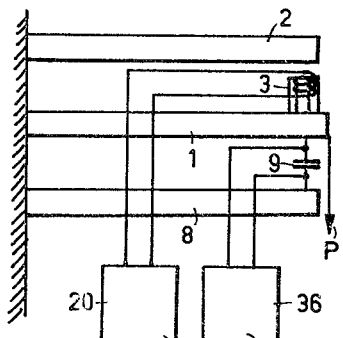
Figure 15:
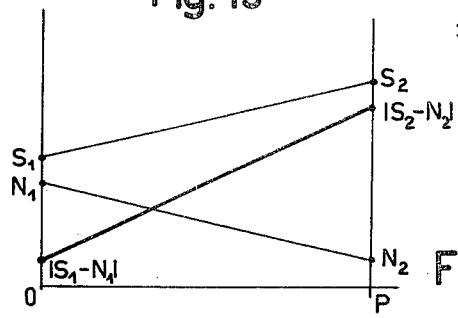

FIG. 9 diagrammatically illustrates a spring member with a variable capacitor;

FIG. 10 diagrammatically illustrates another embodiment of the invention in which a spring member with a coil and capacitor are variable simultaneously;

FIG. 11 diagrammatically illustrates an arrangement employing a spring member with two coils, the variable inductances of which act on different oscillators;

FIG. 12 is a block diagram illustrating two oscillators acting on one mixer stage;

FIG. 13 is circuit diagram of a mixer stage;

FIG. 14 diagrammatically illustrates an arrangement as in FIG. 10 having a spring member with a coil and capacitor which act on different oscillators;

FIGS. 15, 16 and 17 graphically illustrate three cases of oscillator frequencies as a function of force with various settings of the initial frequencies $S_1$ and $N_1$;

FIG. 18 diagrammatically illustrates a frequency doubling stage;

FIG. 19 diagrammatically illustrates an embodiment of the invention employing a spring member with a variable resistance;

FIG. 20 is a circuit diagram of an oscillator, the frequency of which is variable by changes in resistance;

FIG. 21 diagrammatically illustrates a spring member with oppositely variable resistances.

Referring to the drawings, like numerals in the various figures will be employed to designate like parts.

FIG. 1 diagrammatically illustrates an electromechanical measuring member comprising a spring member in the form of spring bar 1 fixed at one end. The force P to be measured acts on bar 1. Unstressed bar 2 remains stationary in relation thereto. A coil 3 with an iron core 3', the inductance value of which is determined substantially by the air gap $\Delta_L$, is rigidly mounted on the movable spring bar 1. The inductance of the coil 3 determines the frequency of an electronic oscillator 10. When a force P acts on spring bar 1, the latter bends thus changing the air gap $\Delta_L$. As a result, the value of the inductance of the coil 3 changes with a resulting change in the frequency of the oscillator 10.

A circuit diagram of such an oscillator is shown in FIG. 2. Connected into the grid circuit of an oscillator tube 7 is an oscillator circuit with the coil 3 and the capacitors 4, 6 and 9.

An arrangement as illustrated by the block diagram of FIG. 3 provides means for detecting and counting the deflection of the spring bar 1 caused by a specific force P. During a specific interval of time $t$ immediately before the force P to be measured acts on the spring bar 1, the number $S_1$ of the cycles of the alternating-current voltage produced by the oscillator 10 at the frequency $f_1$ is counted and stored in a counter 23. The interval of time $t$ is preferably delimited by electronic switch means. Thus during the production of any given number of cycles of constant frequency $f_3$ by oscillator 21, a conventional preselector counter 22 mains electronic switch 11 closed. With a constant frequency $f_3$ and a constant number of cycles during which the switch 11 is closed, the interval of time $t$ is always constant. The switch 11 is coupled to a reversing switch 12 which first conveys the number of cycles of the frequency $f_1$ which have been transmitted by the switch 11, to a counter 23.

In a later period when the force P is effective on the spring bar 1, the frequency of the oscillator 10 would amount to $f_2$. The number of cycles $S_2$ of the alternating-current of frequency $f_2$ is counted during time interval $t$, as well as storing of the value $S_2$. To effect this, the reversing switch 12 is set so that the count values of the number of cycles $S_2$ are stored in a second counter 24 and recorded. The difference between the values of the counting pulses $S_2-S_1$ is a measure which stands in a direct and precisely defined relationship to the force P or to the bending of the spring bar 1 caused thereby. The extent of the interval of time $t$ determines the most advantageous value for the absolute magnitude of the counting pulses $S_2-S_1$. The interval of time $t$ must be selected of a sufficiently short duration such that variations in force within this period of time can be ignored.

As a modification, the counting of the cycles $S_1$ in the unstressed condition can be effected in time after the testing of the number of cycles $S_2$ in the stressed condition. In certain circumstances, the time interval during which variation may occur in the zero setting of the two countings will diminish and as a result the measuring accuracy correspondingly improved. Certain standard regulations for the testing of materials actually prescribe a relatively long testing period. If the cycle counting in the unstressed condition is carried out during a time interval before the counting of cycles in the stressed condition, the time prescribed for the action of the force will lie in a range between these two countings, and during it various environmental conditions may change. Thus, a zero displacement may occur which would produce a counting error. However, if the cycle counting in the unstressed condition is carried out after the cycle counting in the stressed condition, the intervening period of time can be very short because no time conditions have to be fulfilled for the removal of the action of the force and for the return of the resilient system to its initial position. The two countings can therefore follow immediately after one another in time so that the possibility of a displacement of the zero during this period of time is considerably less.

Examples of embodiments of the various circuit details which may be employed in the arrangement shown in FIG. 3 are shown in FIGS. 4 to 7. The oscillator 21 which delivers a fixed frequency $f_3$ may, for example, be constructed like the oscillator 10 shown in FIG. 2. Its coil 3 has a fixed inductance value, however.

A gate circuit as shown in FIG. 4b may be employed for the electronic switch 11, the function of which is shown in FIG. 4a. The input signal at the terminal $a$ passes through a rectifier 14 to the terminal $b$ if there is a potential at the resistor 13 (terminal $v$) which is positive in relation to the terminal $o$; that is to say, the switch 11 is closed in this case. As soon as there is a negative potential at the terminal $v$—in relation to the terminal $o$—rectifier 14 acts as a barrier and the switch 11 is thus open. The necessary positive and negative control potentials for the terminal $v$ are supplied by the counter 22 in the present case.

The electronic reversing switch 12 works functionally as shown in FIG. 5a. It passes an input signal applied to the terminal $a'$ either to the terminal $c$ or $d$. Thus according to whether counting is being effected in the stressed or in the unstressed condition of the spring bar 1, the switch 12 is connected either to the terminal $c$ or $d$. In FIG. 5b a corresponding gate circuit is shown in detail. A control voltage at the terminal $v'$ conveys either a positive or a negative potential in relation to the terminal $o$ to the rectifiers 14 and 16 through the resistor 13. If this potential is positive, the input signal passes from the terminal $a'$ through the rectifier 14 to the terminal $c$; if it is negative, on the other hand, then the rectifier 14 is blocked but the rectifier 16 is open, and the input signal reaches the terminal $d$. The function of the switch 11 and of the reversing switch 12 may also be taken over by a duplicated construction of the switch 11.

The counters 22, 23 and 24 which simultaneously serve to store the counted values "S" may, for example, be constructed in known manner in the form of electro-magnetic pulse counters with stepping mechanisms and counting mechanisms which latter represent the counted values as readable digits. Such pulse counters are only advantageous for relatively low counting frequencies, however.

By way of example, it is possible to employ electronic counting tubes 26 as shown in FIG. 6 which handle considerably higher pulse frequencies. Tube 26 comprises an anode 27 and a grid 28 which are common to a number of cathodes 29. Each cathode 29 is connected through its own resistor 30 to the negative pole of a voltage source. Counting pulses $A$ are applied to the grid 28. Each pulse causes the current conduction between the cathode and anode to pass to the next following cathode. As soon as the turn of the last cathode comes a pulse B is produced which is delivered to a following further counting tube where it represents a further digital place. At the same time, the pulse B causes the counting tube 26 to begin counting from the beginning again.

Counting circuits 22, 23, 24 may also be formed by a bistable multivibrator (common abbreviation BMV) as shown in FIG. 7. It contains transistors 15, 16, voltage dividers 17, 18 and a coupling capacitor 25. Each pulse at the input terminal a (opposite the ground terminal g) changes the bistable multivibrator from one electrically stable position to the other electrically stable position. Thus by connecting n bistable multivibrators in series, every number up to a maximum of n binary digits can be stored in known manner. The series connection is effected, for example, from the output terminal i of the first bistable multivibrator BMV to the input terminal e' of the following bistable multivibrator BMV'; from this second bistable multivibrator BMV' from the output terminal i' to the input terminal e'' of the third bistable multivibrator BMV'' and so on. The electrical state of the multivibrators BMV, BMV', BMV'' indicates a number in the binary system in known manner.

A combination of the counters 23 and 24 to form a forward and backward counter is a particular advantage. In this case, as explained above, the counting of the number of cycles $S_1$ of the oscillator frequency $f_1$ in the unstressed condition of the spring bar 1 is counted in the forward direction, that is to say with increasing counting values. For the counting of the number of cycles $S_2$ of the oscillator freqency $f_2$ in the stressed condition (by the force P) of the spring bar 1, the pulses are taken off not at the output terminals i, i', i'' but in a similar known manner at the output terminals h, h', h''. As a result the counting value $S_1$ first obtained is reduced by the new counting value $S_2$. Thus the difference between the counting values $S_2$ and $S_1$ is stored in the form of the counting value $S_2-S_1$ in the counter. Reversing switch 12 is thus eliminated.

FIG. 8a shows as a graph the number of cyles $S_1$, FIG. 8b the number of cycles $S_2$ and FIG. 8c their difference $S_2 - S_1$ which are obtained over equal time intervals t. This is intended to show how the magnitude of the force P acting on the spring bar 1 is derived from the difference between the number of oscillations $S_2 - S_1$ providing a digital result.

In the embodiment of the invention illustrated in FIG. 9, instead of varying the air gap $\Delta_L$, the deformation of the spring bar 1 varies the spacing $\Delta_C$ of the electrode of a capacitor 9 and so causes capacity variations. Accordingly, the inductance 3 in the oscillator 10 is constant but the capacitor 9 is variable.

FIG. 10 further represents a possible arrangement of an oscillator 10 wherein both the inductance of the coil 3 and the capacity of the capacitor 9 in the same oscillator 10 are influenced by the spring bar 1. Whereas in the arrangements shown in FIG. 1 and FIG. 9, the frequencies are substantially reciprocal to the air gap $\Delta_L$ and to the electrode spacing $\Delta_C$ respectively, in an arrangement as shown in FIG. 10 there is precise proportionality between the variations in the oscillator frequency of the oscillator 10 and the variations in force of the force P.

Nevertheless, the arrangement shown in FIG. 10 should be designed in such a manner that the air gap $\Delta_L$ and the electrode spacing $\Delta_C$ vary equally or at least in the same ratio as the deformation of the spring bar 1. These requirements are met is, with a specific force P, the air gap $\Delta_L$ and the electrode spacing $\Delta_C$ simultaneously become zero.

As heretofore discussed, the variable oscillator 10 has been constructed in such a manner that either the coil 3 or the capacitor 9 or both have been employed to convert the change in shape of the spring bar 1 into variations in inductance and capacity respectively and hence into frequency changes. Particular advantages are obtained in producing frequency changes if two variable oscillators 20 and 36 are used, as shown in FIG. 11. Each oscillator comprises an inductance or capacity-element the inductance and capacity of which can be varied by the deformation. Both oscillators 20 and 36 may be constructed like the oscillator 10, and are provided respectively with variable inductance coils 3 and 5.

In this embodiment, the spring bar 1 is arranged between two rigid bars 2 and 8 so that the inductance of coil 3 increases and the inductance of the coil 5 decreases simultaneously. It follows from this that the frequency of the oscillator 20 drops and the frequency of the oscillator 36 rises. The frequency difference is thus twice as great as with one oscillator alone. For the unstressed condition, the frequency $f_1$ is obtained from the oscillator 20 and the frequency $f'_1$ from the oscillator 36 from which the number of cycles $S_1$ (from the oscillator 20) and $N_1$ (from the oscillator 36) result during the interval of time $t_1$. For the case where the spring bar 1 is loaded by a force P, the oscillator 20 has a frequency $f_2$ and the oscillator 36 a frequency $f'_2$. Over the interval of time $t_2$, which must be equal in length to $t_1$, the numbers of cycles $S_2$ and $N_2$ are counted in a similar manner to $S_1$ and $N_2$. The differential value $(S_1-S_2)-(N_1-N_2)$ represents the measure of the magnitude of the force P in this case.

Instead of counting the numbers of cycles of the individual oscillator 20 and 36, the cycles of the differential frequencies $(S_1-N_1)$ and $(S_2-N_2)$ respectively may be counted. These differential frequencies are formed in a mixer stage 31 (FIG. 12) and utilized similarly to the arrangement as shown in FIG. 3, the oscillator 10 being replaced in this case by the combination consisting of the oscillator 20, oscillator 36 and mixer stage 31. By counting the cycles of the differential frequencies, it is possible to save counting and storage devices in comparison with the method of counting each individual oscillator frequency.

FIG. 13 shows a circuit example of a mixer stage 31 which is suitable for the mixing of the frequencies produced by the oscillators 20 and 36. The oscillators are connected to the input terminals k and o or l and o respectively. The mixer stage comprises the resistors 32, 33 and 34. The differential frequency is taken off at the output m and o.

The frequency of the oscillator 20 may also be determined by the arrangement as shown in FIGS. 1, 9 or 10 while the oscillator 36 comprises neither a variable inductance or capacity. The frequency of oscillator 36 is therefore constant. In this case, therefore, only frequency-determining parts of the oscillator 20 are coupled to the spring bar 1. The mixer stage according to FIG. 13 is supplied in this case with a variable frequency from the oscillator 20 and a fixed frequency from the oscillator 36. Advantages of such an arrangement lie in the fact that the oscillators can work at relatively high frequencies in an arrangement as shown in FIGS. 1, 9 or 10 and the differential frequency can nevertheless be shifted into a range which is particularly suitable for the processing of the counting values.

Instead of the two inductances of FIG. 11, the capacities of two capacitors may be varied by the deformation, in a similar manner to FIG. 9. Both the inductance of the coil 3 and the capacity of the capacitor 9 may, however, be varied simultaneously in a similar manner to FIG. 10. Additionally, the inductance of the coil 3 may be varied by one oscillator, for example oscillator 20 and the capacity of the capacitor 9 may be varied by the other oscillator 36 as shown in FIG. 14.

The differential frequency $f_1-f'_1$ as an initial frequency in the unstressed condition of the spring bar 1 can now be selected from a wide range, providing the following possibilities (hereinafter the corresponding numbers of cycles S and N are inserted instead of the frequencies):

(1) $S_1$ greater than $N_1$, it being assumed that S becomes greater and N becomes smaller as the bending of the spring bar 1 increases; this case is illustrated graphically in FIG. 15. In this case (and this also applies to FIGS. 16 and 17) the ordinates of the numbers of cycles $S_1$ and $N_1$ are plotted against the abscissa value P. The algebraic sum $(S_1-N_1)-(S_2-N_2)$ is now obtained as a result of the fact that the smaller counting value $(S_1-N_1)$ is subtracted from the greater counting value $(S_2-N_2)$. This requires a forward and backward counter as a counting and storage mechanism, in which the counting value $(S_1-N_1)$ is stored during the first measurement and this counting value $(S_1-N_1)$ is reduced by the counting value $(S_2-N_2)$ during the second measurement.

(2) $S_1$ smaller than $N_1$ and the same assumption as under (1) that S becomes greater and N becomes smaller with increasing bending of the spring bar 1. This case is graphically illustrated in FIG. 16. In this case, the differential frequency $(S-N)$ passes through the value zero if S and N are equal in magnitude for a specific value of the bending of the spring bar 1. This case provides an advantage because the counting values $(S_1-N_1)$ and $(S_2-N_2)$ do not have to be subtracted but can be added for which purpose a total counter is sufficient as a counting mechanism.

(3) There is a special case for the setting of the initial frequencies $S_1$ and $N_1$ if $S_1$ is selected equal to $N_1$. (FIG. 17). In this case, the counting is reduced to the determination of the value $(S_2-N_2)$ because the differential frequency $(S_1-N_1)$ has a zero value according to the above hypothesis. A total counter is also sufficient for this case.

With the counting mechanisms described, only whole numbers of cycles can be counted and not fractions thereof. In order to increase the measuring accuracy, therefore, it is an advantage if the numbers of cycles are high so that an uncounted fraction of the first or last cycle has relatively little influence on the accuracy of the measurement. With low numbers of cycles, however, the accuracy can be increased as a result of the fact that the differential frequencies are multiplied before they act on the counting and storage mechanisms. A circuit arrangement 35 for frequency multiplication (in this case frequency doubling) can be connected to the input side of the counters 23 and 24, as shown in FIG. 18. The input signal appears at the terminals p and q. The output terminals are r and s, s being connected to the potential center of the input potential at the terminals p, q. Thus full-wave rectification takes place and the output pulses have double the basic frequency of the input pulses.

The coil 3 in the arrangement shown in FIG. 1, or the coils 3 and 5 in an arrangement as shown in FIG. 11, which are shown as secured to the spring bar 1, may, of course, also be mounted on the rigid bars 2, or 2 and 8 respectively. The effect is the same because only the size of the air gap determines the inductance of the coils 3, or 3 and 5 respectively. This also has the advantage that the electric leads to the coils can be fixedly secured whereas in an arrangement as shown in FIG. 1 or FIG. 11 movable electrical conductors are necessary between oscillator and coil 3 or 3 and 5 respectively.

In the examples heretofore given, the oscillators 10, 20 and 36 respectively have been represented throughout as generators with LC oscillator circuits. As a modification, however, an RC generator may be used as in FIG. 20. Resistance can also be varied by the deformation of the spring bar 1. Known strain gauges, for example, employ such variable resistors. An arrangement which is suitable for this type of force measurement is shown in FIG. 19, the circuit of this oscillator 10 being shown in FIG. 20. The spring bar 1 carries the measuring resistor 41. The deformation of the spring bar 1 is transmitted to the measuring resistor 41 and the value of the measuring resistor 41 is increased when spring bar 1 bends downwards. The measuring resistor 41 acts as a frequency-determining member in the oscillator 10. Together with the fixed capacitors 43, 44 and the load resistors 42, 46 and 47 they form a Wien bridge to which the tube 45 is connected. Together with the tube 50, the anode resistor 49 and the feedback capacitor 48, this circuit is capable of producing and maintaining oscillations, the frequency f of which is determined by the products RC of the values of the resistor 41 and of the capacitor 43 or of the resistor 42 and of the capacitor 44 respectively. Every variation in the value of the measuring resistor 41 will therefore cause corresponding frequency changes which can be used in the same manner to obtain digital results as was described above.

Two variable resistors 41', 41" may, however, be varied in the opposite sense by the deformation of the spring bar 1 as the arrangement in FIG. 21 shows. In this case, the oscillators 20 and 36 are constructed in the form of RC generators in accordance with FIG. 20.

Both frequency-determining resistors (41 and 42) of the Wien bridge may, however, be varied in the same sense as a result of the deformation of the spring bar 1, as a result of which the frequency changes are doubled.

The above disclosure has been given by way of illustration and elucidation and not by way of limitation and it is desired to protect all embodiments of the here disclosed inventive concept within the scope of the appended claims.

What is claimed is:

1. Apparatus for providing a digitally indicated measurement of a force, said apparatus comprising: a resilient member to which the force to be measured may be applied to deform same; an oscillator coupled to said resilient member via means varying the frequency of oscillations of said oscillator in response to deformation of the resilient member; counting means comprising a first counter counting the oscillations produced when said resilient member is unstressed and a second counter counting the oscillations produced when said resilient member is stressed; timed switch means coupling said oscillator to said counting means; said counting means counting the number of oscillations produced by said oscillator during finite time intervals during which forces are applied to the resilient member, and during which forces are not applied, whereby the relationship of the counted oscillations under conditions of force application and under conditions where force is not applied are compared to provide a digital indication of the force.

2. Apparatus as in claim 1 in which said means varying the frequency of oscillations of said oscillator in response to resilient member deformations comprise: a coil positioned with respect to said resilient member so that movement of said resilient member will vary the inductance of said coil.

3. Apparatus as in claim 1 in which said means varying the frequency of oscillations of said oscillator in response to resilient member deformations comprise: a capacitor positioned with respect to said resilient member so that movement of said resilient member varies the capacitance of said capacitor.

4. Apparatus as in claim 1 in which said means varying the frequency of oscillations of said oscillator in response to resilient member deformations comprise: a coil positioned with respect to said resilient member so that movement of said resilient member will vary the inductance of said coil, and a capacitor positioned with respect to said resilient member so that movement of said resilient member varies the capacitance of said capacitor.

5. Apparatus as in claim 1 in which said means varying the frequency of oscillations of said oscillator in response to resilient member deformations comprise: a resistor, the resistance of which is dependent on the deformation of said resilient member.

6. Apparatus as in claim 1 having a second oscillator coupled to said resilient member.

7. Apparatus as in claim 1 in which said first counter counts a predetermined number of oscillations of fixed frequency, whereby the time of counting is delimited.

References Cited by the Examiner

UNITED STATES PATENTS

| | | | |
|---|---|---|---|
| 1,930,905 | 10/33 | Nicolson | 73—88.5 X |
| 1,975,516 | 10/34 | Nicolson. | |
| 2,576,900 | 11/51 | Brockman | 235—92 |
| 2,656,106 | 10/53 | Stabler | 235—92 |
| 2,697,594 | 12/54 | Stanton | 73—517 |
| 2,732,713 | 1/56 | Willits | 73—88.5 X |
| 2,880,612 | 4/59 | Coyne et al. | |
| 2,912,861 | 11/59 | Coyne et al. | |
| 3,000,208 | 9/61 | Piazza | 73—88.5 X |
| 3,052,116 | 9/62 | Critchley et al. | 73—88.5 |
| 3,158,028 | 11/64 | Chope | 73—398 |

RICHARD C. QUEISSER, *Primary Examiner.*

ROBERT L. EVANS, *Examiner.*